Jan. 15, 1935.  T. FAY  1,988,307
PLANT ACTIVATING DEVICE
Filed March 13, 1933

Inventor
Temple Fay
Leonard L. Kalish
Attorney.

Patented Jan. 15, 1935

1,988,307

UNITED STATES PATENT OFFICE 1,988,307

PLANT ACTIVATING DEVICE

Temple Fay, Philadelphia, Pa.

Application March 13, 1933, Serial No. 660,548

3 Claims. (Cl. 47—1)

My invention relates to a new and useful device or means for activating plants, and a method of activating plants, whereby plants, such as potted plants or plants planted directly in the garden, may be activated and their growth insured and accelerated.

One of the objects of my present invention is to insure the growth of plants immediately following transplanting of the same and to insure the growth of cuttings of plants after the same have been planted.

A further object of my present invention is to provide means whereby plant life may be activated and the growth of plants made more certain, and whereby the growth of plants may be accelerated by the provision of a combined sub-reservoir of food and moisture, which will possess absorption and retaining qualities sufficient to act as an accumulator and a reservoir to tide the plant over what would otherwise be dry periods.

A further object of my present invention is to provide means whereby a sub-reservoir of food and moisture may be maintained and retained at the root and in the root zone of the plant, which will not be adversely influenced either by undue amount of rain and resultant drainage through the soil, or by undue drought or dryness, but which will be capable of conserving and preserving both the plant food values as well as the desired water or moisture in the face of adverse conditions of nature.

With the above and other objects in view, which will appear more fully from the following detailed description, my invention consists in the provision of an accumulator and reservoir of plant food and moisture, in the root zone of the plant, comprising a cohered body of water-absorbent, decayed vegetable matter and fertilizer, cohered by pressure or a binder, or both, so that it will rapidly absorb and retain moisture, without, however, being cohered or compacted to such an extent as to form a barrier or obstruction to root growth or to the free movement of the roots.

Thus, such materials as peat moss have been utilized in various ways on account of certain plant values; peat moss in particular has been utilized by spreading the loose peat moss in very much the same manner as fertilizers are applied to the garden or soil.

I have found, however, as a result of systematic research, that by compacting or cohering a body of peat moss or the like, to an extent sufficient to eliminate the major interstices within a body of peat moss, and to cause the particles of peat moss to remain in fairly contiguous relation to each other, without however being cohered or compacted so solidly as to prevent the absorption of water or to act as a barrier to root movement and growth, it is possible to create a very rapid absorption of water into the body of peat moss, much more rapid than if the peat moss were not cohered or compacted, and said body of cohered or compacted peat moss will then retain said moisture in the face of adverse climatic conditions or adverse conditions of the soil for a much longer period of time than if it were not cohered or compacted.

My invention further contemplates the provision of a body or mass of peat moss or the like, cohered or compacted into a sufficiently contiguous relation to the individual particles, to cause a rapid absorption and a thorough retention of moisture in said body, without however, being cohered or compacted sufficiently to prevent the absorption of water or to act as a barrier to the free movement or growth of the roots.

My invention further consists of certain novel combinations of cohered and compacted peat moss or the like, and fertilizer, and binder materials.

My invention further consists of other novel features, which will appear more fully from the following detailed description.

For the purpose of illustrating my invention, I have shown in the accompanying drawing one form thereof which is at present preferred by me, since the same has been found in practice to give satisfactory and reliable results, although it is to be understood that the various instrumentalities of which my invention consists, can be variously arranged and organized, and that my invention is not limited to the precise arrangement and organization of the instrumentalities as herein shown and described.

Referring to the drawing, in which like reference characters indicate like parts:

To carry out my invention, I may mix suitable proportions of peat moss (the particular type of peat moss being sphagnum peat moss), and a fertilizer, preferably a nitrogenous salt, such as calcium cyanamid, potassium or sodium nitrate, or an ammonium phosphate or other suitable phosphate. The mixture is preferably made with the aid of water or other vehicle, and the fertilizer salts are preferably first dissolved in water and then thoroughly admixed with the peat moss. To the mixture I may also add a suitable quantity of a binder, such as gluten, starch, flour, gelatine, various sugars, such as sugar of milk, or the like.

The peat moss mixture may then be formed into suitable cake-like masses, which are then de-hydrated by any suitable means, with or without the application of heat. The formation of these cake-like or briquette-like bodies may be effected by putting suitable quantities of the mixture into suitably sized molds, where the material is then permitted to set or is cohered with or without the application of pressure or with varying degrees of pressure, depending upon the character and amount of binder employed.

Thus, I may compact or cohere the peat moss into suitable bodies and eliminate the major interstices therein, by the formation of said bodies in dies by suitable compression under suitable pressures. By employing sufficiently high compression pressures, I can eliminate the major interstices in the bodies, and bring the particles into a sufficiently contiguous relation to each other for rapid water absorption and thorough water retention purposes, without any added binder. I may also cohere these bodies of peat moss with the particles thereof in suitably contiguous relation to each other, by the addition of suitable binders, such as those mentioned above, and others, added in suitable quantities. By the use of the binders, the particles of peat moss may be brought into sufficiently contiguous relation to each other for rapid water absorption and thorough water retention purposes, without the aid of substantial compression pressures, or even without the aid of any compression pressure. So too, I may vary the amount of binder employed inversely to the amount of compression pressure employed.

Figure 2:
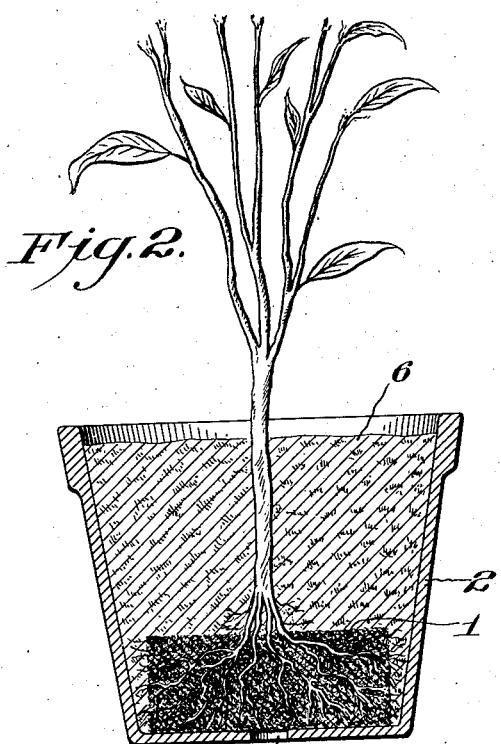
Figure 2 represents a vertical sectional view of a potted flower and flower pot, embodying my invention.
Figure 3:
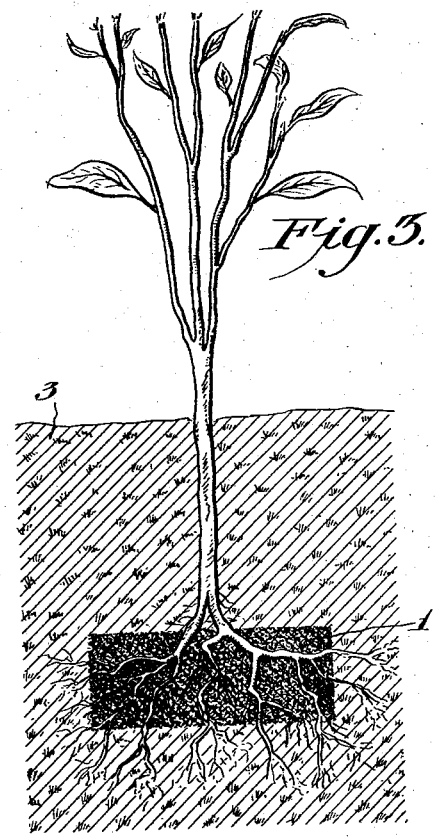
Figure 3 represents a similar vertical sectional view of a garden plant zone embodying my invention.

The resultant bodies of peat moss, designated in the drawing generally by the numeral 1, are then placed in the root zone of the plant, as indicated in Figures 2 and 3, either at the bottom of the pot 2 or directly in the soil 3 of the garden, as indicated in Figure 3.

In placing the body of peat moss 1 into a flower-pot 2, it is unnecessary to put a suitable loose piece of broken flower-pot over the lower drain hole 4, as indicated in Figure 2. The peat moss cake 1 is placed at the bottom of the flower-pot and the plant, cutting, seed or bulb is then placed over it in a suitable mass of earth or soil 6. The peat moss cake may be saturated with water before it is put in place, or the water may be added from above or beneath after the planting has been completed. In either event the peat moss body 1 rapidly absorbs its full content of water and then tends to retain its water content against adverse conditions. So too, the compacted or cohered body of peat moss will not only resist the loss of its water content, but will tend to accumulate water. So too, any excessive moisture and drainage, such as is occasioned by severe or continued rainfall, or by excessive watering of the plant, will not materially affect this compacted or cohered body of peat moss, that is, any excessive water draining through the soil or earth will not "wash through" the compacted or cohered body of peat moss. Under such conditions this compacted or cohered body will merely quickly accumulate its full water content, if it does not already have its full water content at that time, and will thereafter not be particularly affected by additional water. Thus, any excessive water draining through the soil will not materially drain through or "wash through" the compacted or cohered body 1, because said body, regardless of the degree of its water content at the time, always constitutes a unitary body, which, while soft enough (when it has once accumulated a water content) to be readily penetrated by root growth in any direction, is sufficiently unitary to resist free drainage therethrough. The reason for this is that the water content of this compacted or cohered mass or body is locked or entrapped within the mass more intimately and is retained with greater affinity than in uncohered or uncompacted peat moss or other material, and is retained with far greater affinity than that existing between the water and the surrounding soil.

A suitable embodiment of my invention may be produced with relatively low compression, by mixing sixty-one (61) pounds of peat moss of the commercial form, nine pounds of fertilizer, twenty-five (25) pounds of gluten, and five (5) pounds of chalk. The fertilizer may be a mixture of ammonium sulphate, superphosphate and potassium chloride in the ratio of 5, 7 and 6. The gluten may be in the form of flour or starch. The fertilizer and the gluten are preferably first mixed with a quantity of water just sufficient to wet the peat moss employed. The fertilizer is dissolved, and the gluten is partly dissolved and partly suspended in the water. The chalk in powdered form may be first mixed with the peat moss or may be added to the water. The water, containing the fertilizer and binding material is then admixed with the peat moss by any suitable mixing apparatus or commercial mixer, and the resultant mixture is then molded in suitable molds and then dehydrated. By the use of compressive pressure in the formation of cakes, the amount of water and binder employed may be reduced. If sufficiently high compressive pressures are employed, water may be entirely eliminated and the peat moss, suitably screened, may be mixed dry with the suitable proportion of gluten, chalk and fertilizers, and then compressed. The gluten serves not only to bind the peat moss, but also serves to increase the speed of water absorption of the resultant body.

The small percentage of chalk employed serves to neutralize any acids which may be formed by decomposition, though chalk is otherwise relatively inert.

Figure 1:
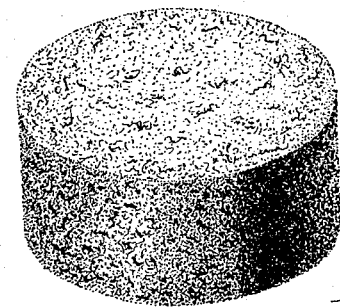
Figure 1 represents a perspective view of a cake-like body of compacted or cohered peat moss for use in carrying out my invention.

Since the cohered or compacted body of peat moss expands under the influence of water, it is preferable to utilize a compacted body which is slightly less in diameter than the smallest internal diameter of the flower pot. Under the influence of water or moisture the compacted or cohered body of peat moss quickly softens and swells to a slight extent, thereby forming a relatively loose, though yet cohered mass, that is, a mass which is still devoid of any major interstices and which will retain the absorbed and accumulated water with great affinity, and more particularly with affinity greater than un-compacted or un-cohered materials, and with greater affinity than the adjacent soil. In practice, I have found that the preferred size of the bodies shown in Figure 1, is about one-half inch, three-quarters of an inch, or an inch in thickness; and about two, two and one-half, or three inches in diameter.

The weight of each cake or tablet is one to two ounces (more or less), depending on the relative size of the cake or tablet. The pressure used to compact these cakes or tablets is approximately 150 lbs. (more or less).

The increased affinity of the compacted or cohered body of decayed vegetable matter, such as peat moss, by reason of the elimination therein of any major interstices, by compacting the same or by cohering the same with binders, the fertilizer content or plant food content of the mass, as for instance the added nitrogenous or phosphate compounds, as well as the plant values of the peat moss itself, are more thoroughly retained within this cohered or compacted mass, because, as stated above, said compacted or cohered mass tends to resist direct drainage therethrough and hence tends to resist the washing out of these plant food ingredients or values.

By the use of suitably high pressures of compression, the cohering and compacting may be effected without the use of any additional water, other than the normal moisture content of the ingredients. Thus, I may take suitably screened peat moss and the fertilizer ingredients and a binder, such as powdered gluten, starch, milk sugar, or the like, and after a thorough admixture of the dry ingredients, I may compact the same under high pressure in suitable dies or molds, with the aid of a suitable press.

The binder not only serves to increase the cohesion and to eliminate the interstices within the body, but also serves to increase the water absorptive capacity of the resultant body. Thus, it is desirable to add a binder, such as gluten, starch or the like, to the other ingredients, even when compacted without any added water, and under high pressure.

For the best results, I prefer to pack these bodies, preferably in suitable numbers, in a moisture-proof casing, for storage and transit and for general handling, owing to the water absorptive capacities of these cohered and compacted bodies, and in order to maintain these bodies, while in storage and in transit, in a condition free from foreign contamination, such as may induce germination or bacterial growth, so that when put to ultimate use, they may be in a sterile condition.

Figure 4:
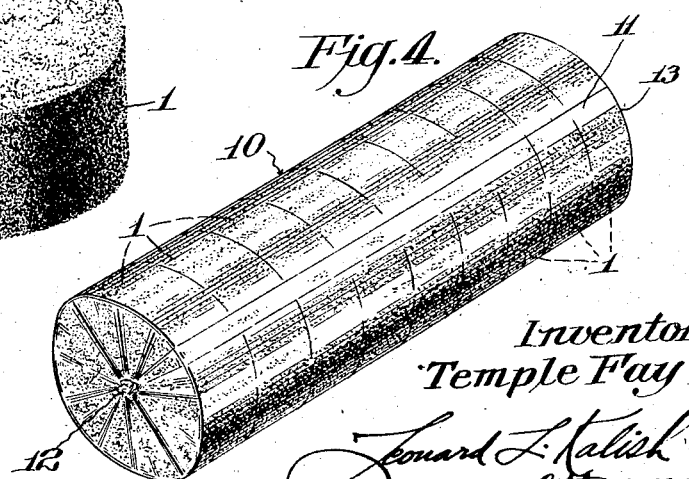
Figure 4 represents a completed package of several of the cohered or compacted bodies, in a moisture-proof wrapping, ready for storage or shipment.

I prefer to form vendable units, such as shown particularly in Figure 4 of the drawing, comprising one or more of these cake-like cohered and compacted bodies, surrounded throughout by a moisture-proof and dust-proof casing, which is indicated generally by the numeral 10. This casing 10 is preferably of an impervious sheet of transparent regenerated cellulose, sometimes known in the trade as "Cellophane" and sometimes known in the trade as "Sylphrap", the longitudinal edges of which overlap each other at 11, and are secured to each other by fusion, or by suitable adhesive, and the ends of which are spun or otherwise closed as indicated at 12 and 13, with or without the use of fusion or adhesive. The resultant vendable unit has the advantage that the contents are protected from moisture and undesirable germs, and its character may always be observed without opening the package. Thus, should a package of this material deteriorate by reason of imperfection in the wrapping, and by the ingress of moisture, the same may be observed without opening up the package. In this manner, a constant and ready inspection of the stored material may be had at all times, without the necessity for unwrapping the material.

Thus, the user may obtain a convenient package of conveniently sized units of these compacted or cohered bodies which he may maintain safely and without deterioration either from moisture or germ contamination and then place into the root zone of a plant when needed.

Owing to the water absorptive capacity of this device, it is possible to water potted plants, entirely from beneath, by periodically placing the pots in a suitable shallow tray of water, as the water will be quickly drawn up into this compacted and water absorptive body.

By reason of the rapid absorption of water by the device of the present invention, and the much retarded and delayed evaporation or loss of water under adverse conditions, the moisture at the root zone of the plant may be regulated to an extent sufficient to provide the necessary water vehicle for the fertilizer and plant food, and for making said fertilizer and plant food always available to the plant, because said fertilizer or plant food is thus always maintained in aqueous solution, in condition for absorption by the plant.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and desire to secure by Letters Patent, is:—

1. A plant activating coherent cake consisting of sphagnum moss, fertilizer, gluten and chalk intimately mixed, the sphagnum moss constituting more than 50% by weight of the cake, said cake being generally devoid of major interstices, being sufficiently firm and durable to permit of ready handling in storage and shipment and being capable of rapid accumulation of a water content of an amount greater than its own weight, and being relatively soft and penetrable when it has absorbed water, said coherent cake being adapted to be placed in the root zone of a plant, for maintaining a reservoir of water at said zone in the face of adverse conditions.

2. A plant activating water absorbent dry sterile cohert compact cake comprising sphagnum moss, fertilizer, gluten and chalk intimately mixed, the sphagnum moss constituting more than 50% by weight of the cake.

3. A process of making a plant activator, which comprises intimately mixing together cold water, sphagnum moss, fertilizer, gluten and chalk, the sphagnum moss constituting more than 50% by weight of the total solid ingredients, and compacting the mixture into cakes.

TEMPLE FAY.